United States Patent
Hsia

[11] Patent Number: 6,155,592
[45] Date of Patent: Dec. 5, 2000

[54] FOLDABLE SUPPORTING FRAME FOR STROLLER

[76] Inventor: Ben Ming Hsia, 27756 Avenue Mentry, Santa Clarita, Calif. 91355

[21] Appl. No.: 09/139,943

[22] Filed: Aug. 25, 1998

[51] Int. Cl.[7] ............................................. B62B 1/00
[52] U.S. Cl. ................ 280/647; 280/33.991; 280/47.38; 280/DIG. 3; 280/642
[58] Field of Search .................... 280/47.38, 647, 280/656, DIG. 3, 47.26, 33.991, 33.992, 642

[56] References Cited

U.S. PATENT DOCUMENTS

| | | | |
|---|---|---|---|
| 2,453,631 | 11/1948 | Leser et al. | 280/33.992 |
| 2,558,372 | 6/1951 | Nidermayer, Jr. | 280/33.992 |
| 4,953,887 | 9/1990 | Takahashi et al. | 280/647 |
| 5,090,724 | 2/1992 | Fiore | 280/643 |
| 5,380,262 | 1/1995 | Austin | 280/647 |
| 5,653,460 | 8/1997 | Fogarty | 280/642 |
| 5,676,386 | 10/1997 | Huang | 280/30 |

FOREIGN PATENT DOCUMENTS

| | | | |
|---|---|---|---|
| 47706 | 3/1982 | France | 280/33.992 |
| 4202428 | 3/1982 | Germany | 280/33.992 |
| 308713 | 3/1989 | Germany | 280/33.992 |

*Primary Examiner*—Eric Culbreth
*Assistant Examiner*—James S. McClellan
*Attorney, Agent, or Firm*—Raymond Y. Chan; David and Raymond

[57] ABSTRACT

A foldable supporting frame adapted for mounting on a back frame of a stroller for carrying a storage cart or a baby car seat, wherein the foldable supporting frame includes a U-shape main frame pivotally connected to the back frame of the stroller in such manner that the main frame is capable of swinging between a horizontal position and a folding position that the main frame is parallel to the back frame of the stroller, a locking device for selectively locking the main frame in the horizontal position, an additional carrying device adapted to incorporate with the main frame, and a holding device affixed on the main frame for detachably holding the additional carrying device in a locked position.

34 Claims, 5 Drawing Sheets

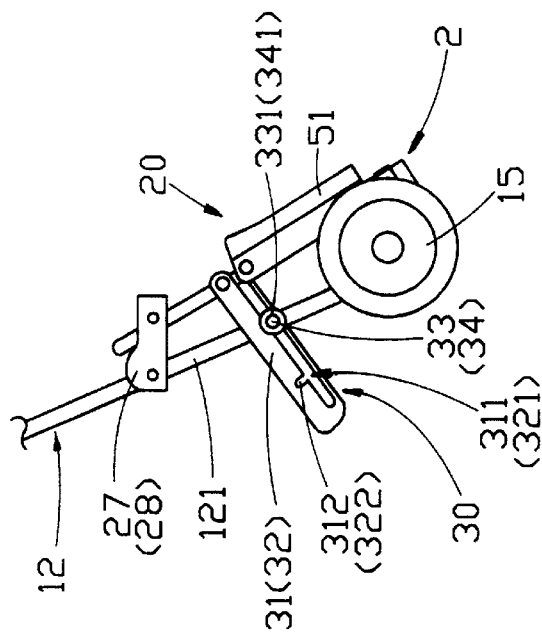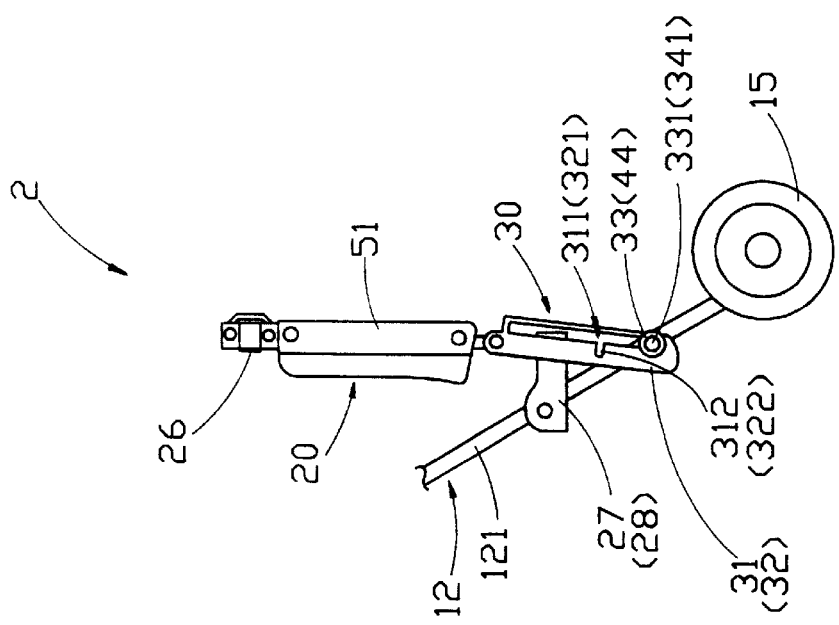
FIG.3B
FIG.3A

FOLDABLE SUPPORTING FRAME FOR STROLLER

FIELD OF THE PRESENT INVENTION

The present invention relates to a stroller, and more particularly to a foldable supporting frame adapted for mounting on a back frame of a foldable stroller for carrying a storage cart or a baby car seat.

BACKGROUND OF THE PRESENT INVENTION

Stroller becomes a necessity to every family having a young child or baby. The conventional stroller contains a foldable structure to reduce its size for storing in the trunk. As shown in FIG. 1, the conventional stroller 10 generally comprises a front frame 11 comprising a pair of front supporting posts 111 and a U-shaped handle bar 112 having two ends respectively connected to two top ends of the pair of front supporting posts 111, a back frame 12 comprising a pair of parallel back supporting stems 121 pivotally connected with the front frame 11 by means of a pair of pivot joints 13, a pair of front wheels 14 rotatably mounted on bottom ends of the pair of front supporting posts 111, a pair of back wheels 15 rotatably mounted on bottom ends of the pair of back supporting stems 121, a seat frame 16 mounted between the front frame 11 and the back frame 12 for supporting a baby to place thereon, and a pair of folding joints 17 for connecting the pair of front supporting posts 111 and the two ends of the handle bar 112 together to form the rigid front frame 11, wherein by operating the folding joints 17, the handle bar 112 can be folded rearwardly and downwardly towards the back frame 12, so as to fold up the stroller 10 to reduce its size, as shown in FIG. 4.

The conventional foldable stroller is considered as a convenience tool to carry the baby or young child during outdoor activities such as foot traveling and shopping.

The problem is that most parents have to carrying plenty of baby necessities, such as cans of milk powder, diapers, milk bottles, blankets, extra clothes, thermos bottles, and etc.. In addition to their personal necessities, the parents are heavy loaded. The situation will be more worse when the parents are going for shopping. A parent must carry those purchased goods by hands while, at the same time, operating his or her stroller. In order to reduce their personal load, some parents may try to hang their traveling bags, shoulder bags, shopping bags, or other hand carrying packs on the handle bar of the stroller. However, it is very danger because the stroller is not a storage cart or a goods transportation tool. It is specifically designed to transport infant and child only. Therefore, the weight hanged on the handle bar may render the stroller losing its balance and turning over. It is also unreasonable for a parent to use the storage cart and the stroller at the same time. In fact, shopping becomes an extravagant hope for most parents.

Moreover, due to the safety reason, infant must be traveled by an infant car seat in vehicle. To an infant younger than six months old, it is not a wise matter to frequently transfer the infant between the car seat and the stroller. It is because any mistake may cause unwanted injury to the soft and weak infant.

It is another headache to some parents who have two infants or babies. Most parents would purchase a stroller for their first child. However, when they have one more baby, they may immediately purchase one more stroller, but that it is impossible for a single parent to handle two strollers at the same time.

SUMMARY OF THE PRESENT INVENTION

It is thus a first object of the present invention to provide a foldable supporting frame adapted for mounting on a back frame of a stroller, wherein the parents may take advantage of the foldable supporting frame to carry a storage cart or a baby car seat, so that the parent may easily handle the stroller and the storage cart or the baby car seat at the same time without extra labor. If a storage cart is carried by the foldable supporting frame, the parent may collect all the baby necessities and personal stuffs in the storage cart. The parent may also directly move the baby car seat to install on the foldable supporting frame of the stroller, so that the parent can transport both babies at the same time.

A further object of the present invention is to provide a foldable supporting frame adapted for mounting on a back frame of a foldable stroller, wherein the foldable supporting frame can also be folded up when the stroller is collapsed.

Yet another object of the present invention is to provide a foldable supporting frame for a foldable stroller, wherein the foldable supporting frame would not occupy space when the stroller is collapsed.

Still another object of the present invention is to provide a foldable supporting frame for a foldable stroller, wherein a storage cart having specific configuration is used to incorporate with the foldable supporting frame, so that the storage cart can be used as a normal storage cart or adjusted to fit the foldable supporting frame for rigid construction.

Still another object of the present invention is to provide a foldable supporting frame for stroller, wherein the structure of the foldable supporting frame is inexpensive and the operation of the supporting frame is easy and convenience.

Accordingly, in order to accomplish the above objects, the present invention provides a foldable supporting frame adapted for mounting on a back frame of a stroller, wherein the foldable supporting frame comprises a U-shape main frame pivotally connected to the back frame of the stroller in such manner that the main frame is capable of swinging between a horizontal position and a folding position that the main frame is parallel to the back frame of the stroller, a locking means for selectively locking the main frame in the horizontal position, an additional carrying device adapted to incorporate with the main frame, and a holding means affixed on the main frame for detachably holding the additional carrying device in a locked position.

In addition, the main frame comprises two holding arms and a supporting arm connected between two front ends of the two holding arms respectively, wherein two rear ends of the holding arms are extended outwardly from the back frame of the stroller. A bounded receiving room is defined between the two holding arms and the supporting arm, wherein an entrance opening is formed between two rear ends of the two holding arms. A gate bar is mounted between two rear ends of the two holding arms respectively for closing the entrance opening.

In one embodiment of the present invention, the additional carrying device is embodied as a storage cart, wherein the entrance opening can be re-opened by detaching the gate bar to enable the storage cart entering the bounded receiving room through the entrance opening. The holding means comprises two holder units respectively affixed to the two holding arms for engaging with two supporters respectively provided on two sides of the storage cart so as to support and hold the storage cart in position.

In another embodiment of the present invention, the additional carrying device is embodied as a baby car seat, wherein a bottom portion of the baby car seat is inserted in the bounded receiving room so as to support the baby car seat by the two holding arms, the supporting arm and the gate bar. The baby car seat can also be locked in position by means of the holding means.

BRIEF DESCRIPTION OF THE DRAWINGS

FIG. 3A is a partial side view illustrating an up-folding position of the foldable supporting frame with respect to the back frame of the stroller in accordance with the above first preferred embodiment of the present invention.

FIG. 3B is a partial side view illustrating a down-folding position of the foldable supporting frame with respect to the back frame of the stroller in accordance with the above first preferred embodiment of the present invention.

DETAILED DESCRIPTION OF THE PREFERRED EMBODIMENTS

Figure 1:
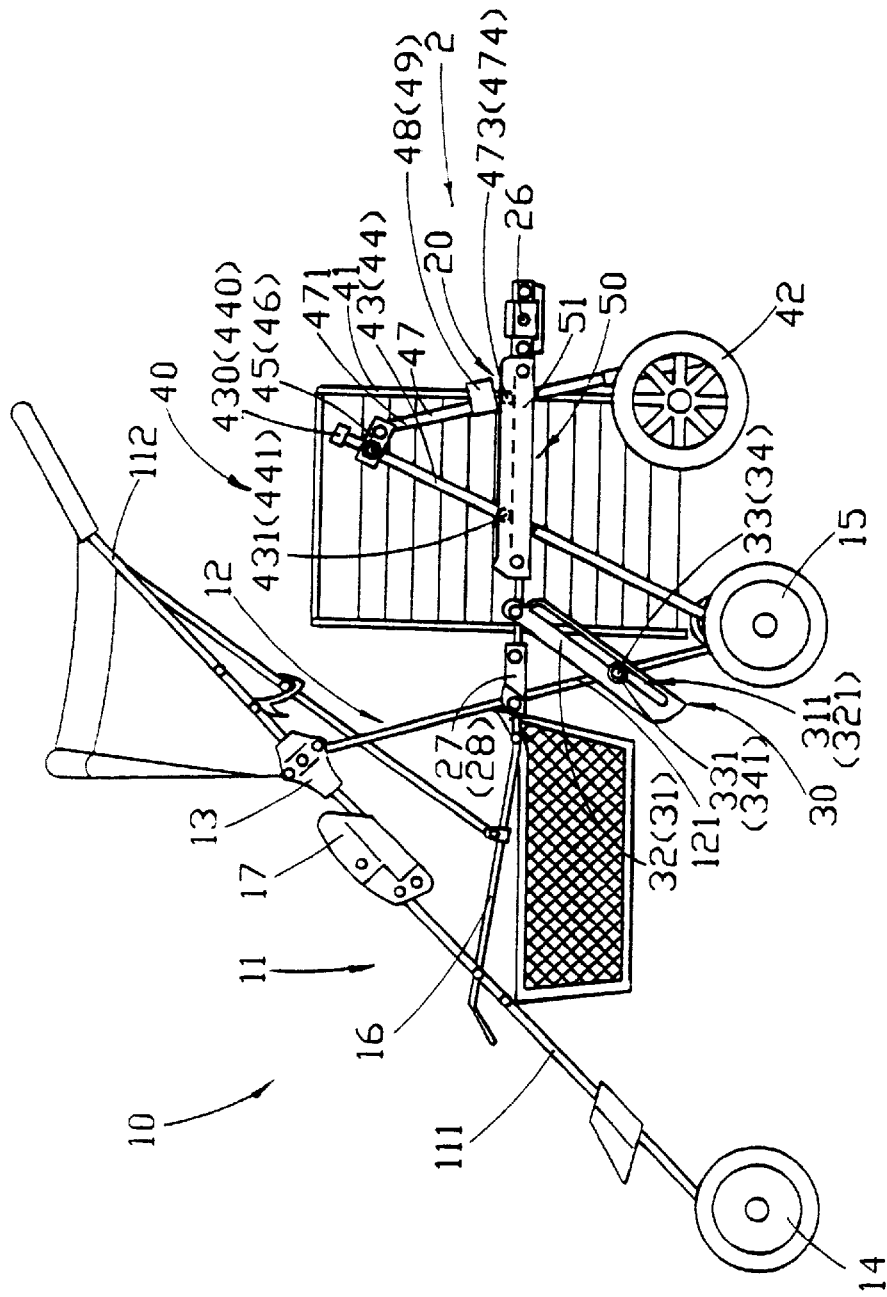
FIG. 1 is a side view of a stroller having a foldable supporting frame adapted to carry a storage cart in accordance with a first preferred embodiment of the present invention.

Referring to FIGS. 1 to 4, a foldable supporting frame 2 adapted for mounting on a back frame 12 of a stroller 10 according to a first preferred embodiment of the present invention is illustrated. The foldable supporting frame 2 comprises a U-shape main frame 20 pivotally connected to the back frame 12 of the stroller 10 in such manner that the main frame 20 is capable of swinging between a horizontal position and a folding position that the main frame 20 is parallel to the back frame 12 of the stroller 10, a locking means 30 for selectively locking the main frame 20 in the horizontal position, an additional carrying device 40 adapted to be supported and carried by the main frame 20, and a holding means 50 affixed on the main frame 20 for detachably holding the additional carrying device 40 in a locked position.

Figure 2:
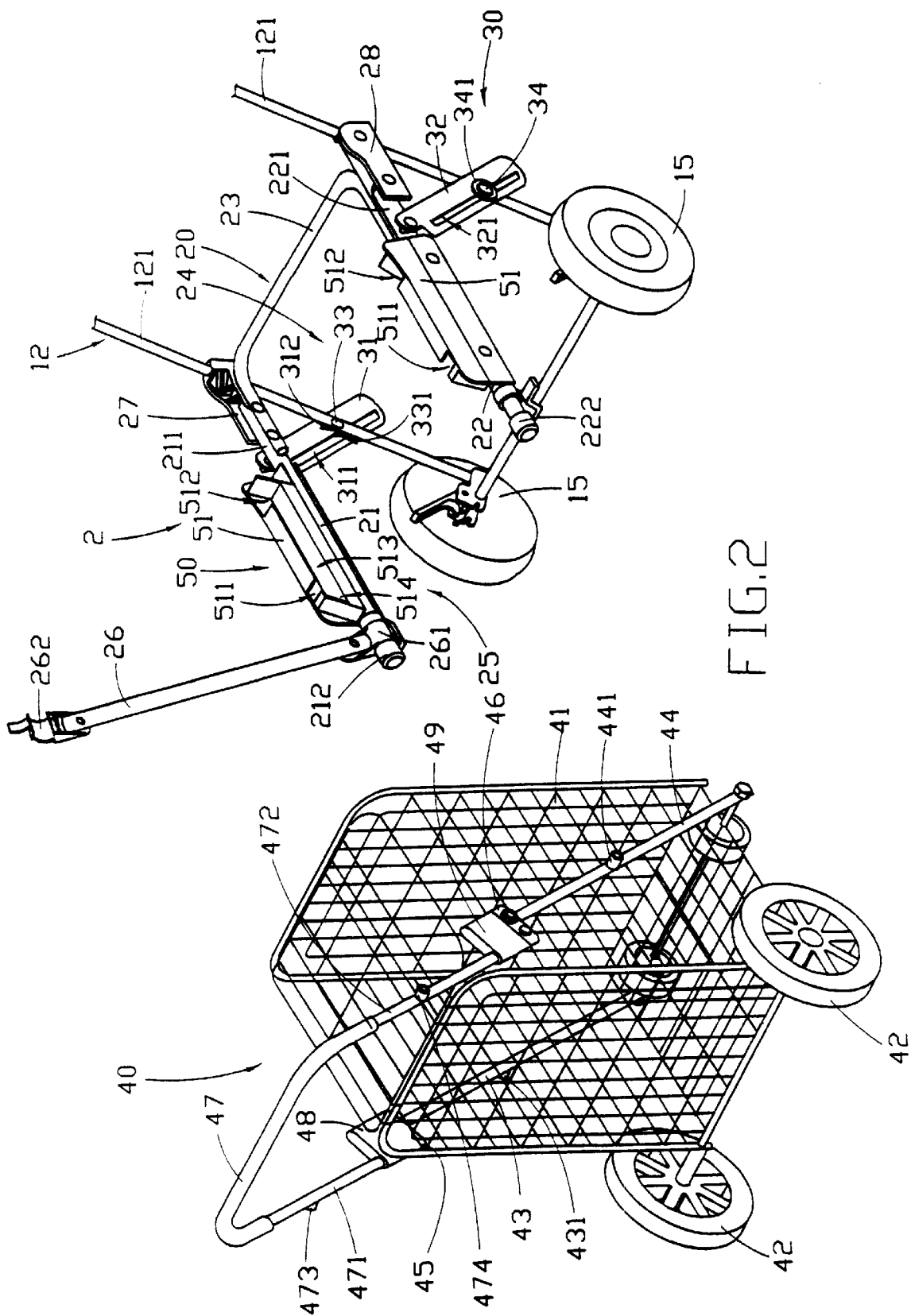
FIG. 2 is an exploded partial perspective view illustrating the foldable supporting frame and the storage cart in accordance with the above first preferred embodiment of the present invention.

As shown in FIG. 2, the main frame 20 comprises two holding arms 21, 22 and a supporting arm 23 connected between two front ends 211, 221 of the two holding arms 21, 22 respectively to form a connecting side of the foldable supporting frame 10 adapted for pivotally connecting with the back frame 12 of the stroller 10. Two rear ends 212, 222 of the two holding arms 21, 22 are extended rearwardly from the back frame 12 of the stroller 10. A bounded receiving room 24 is defined between the two holding arms 21, 22 and the supporting arm 23, wherein an entrance opening 25 is formed between two rear ends 212, 222 of the two holding arms 21, 22. A gate bar 26 is removably mounted between two rear ends 212, 222 of the two holding arms 21, 22 respectively for closing the entrance opening 25 and reinforcing the main frame 20 to form a rigid rectangular structure.

As mentioned in the background of the present invention, the back frame 12 comprises a pair of parallel back supporting stems 121 pivotally connected with the front frame 11 by means of a pair of pivot joints 13, wherein a pair of back wheels 15 are rotatably mounted on two bottom ends of the pair of back supporting stems 121 respectively.

Figure 4:
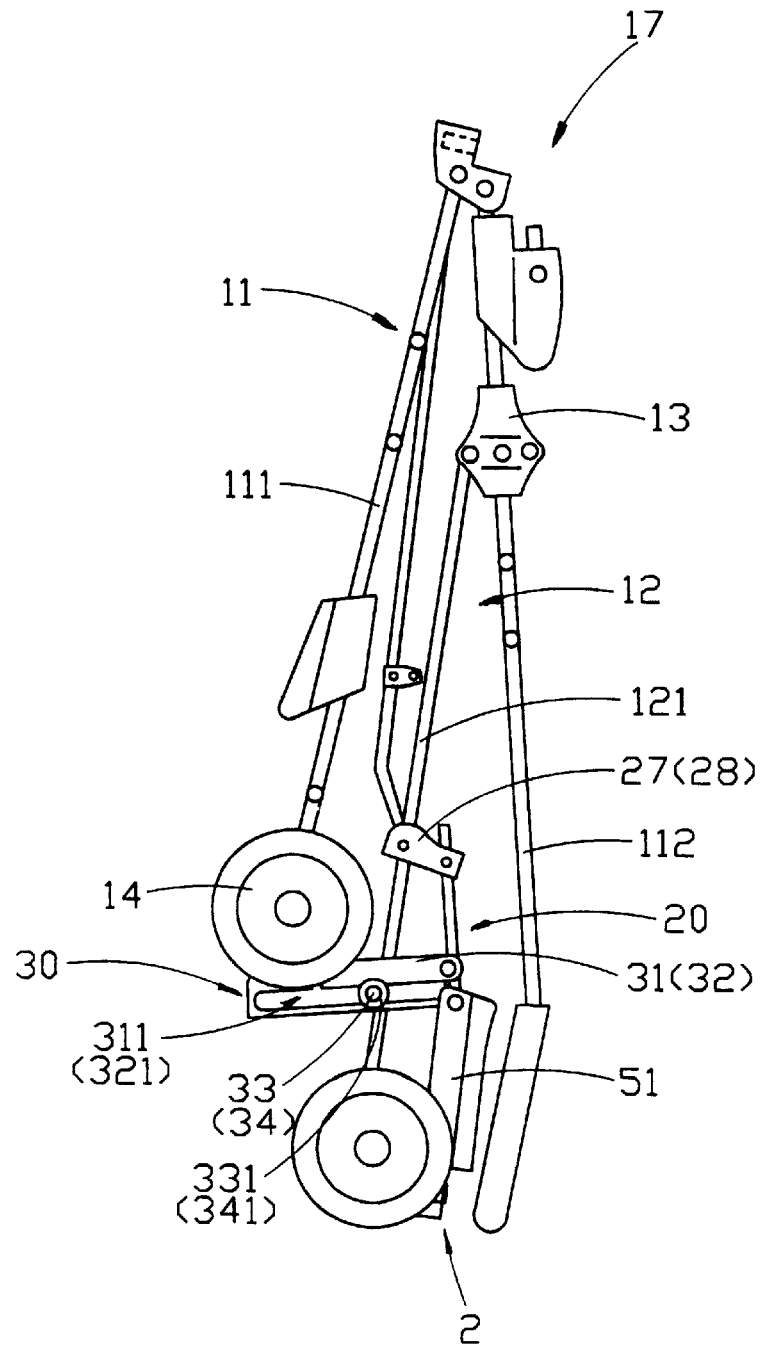
FIG. 4 is a side view of the stroller as shown in FIG. 1, wherein the stroller is collapsed to a fold up condition.

As shown in FIGS. 1 to 4, the foldable supporting frame 2 further comprises a pair of pivot joints 27, 28 each having a connecting side affixed on a middle portion of the respective back supporting stem 121 and a pivot end horizontally extended from the connecting end for pivotally connecting with the two front ends 211, 221 of the two holding arms 21, 22 of the main frame 20. Therefore, by means of the two pivot joints 27, 28, the main frame 20 can be vertically folded upwards when it is not in use, as shown in FIG. 3A, or selectively folded downwards until in parallel with the two back supporting stems 121 when the stroller 10 is collapsed, as shown in FIGS. 3B and 4.

Referring to FIGS. 1, 2, 3A, and 3B, the locking means 30 comprises a pair of locking arms 31, 32 made of strengthened metal plate and two guiding pins 33, 34. Each of the locking arms 31, 32 has a mounting end pivotally connected to the respective holding arm 21, 22 of the main frame 20. Each of the locking arms 31, 32 further provides an elongated guiding slot 311, 321 extended from the mounting end to a free end thereof. Each of the guiding slots 311, 321 has a locking recess 312, 322 perpendicularly provided near the free end thereof, as shown in FIGS. 3A and 3B. The two guiding pins 33, 34 are respectively affixed to the two back supporting stems 121 below the two pivot joints 27, 28 of the back frame 12 of the stroller 10, wherein the two guiding pins 33, 34 respectively penetrate through the two guiding slots 311, 321 of the two locking arms 31, 32.

As shown in FIGS. 1 to 4, two holder rings 331, 341 are respectively mounted on two pin ends of the two locking pins 33, 34 so that the two locking arms 31, 32 are slidably positioned between the two holder rings 331, 341 and the two back supporting stems 121 of the back frame 12 of the stroller 10 respectively.

Therefore, as shown in FIG. 3A, when the foldable supporting frame 2 is not in use, it can be vertically upfolded until the locking pins 33, 34 positioning at two lower ends of the two guiding slots 311, 321 respectively for saving space. As shown in FIGS. 3B and 4, when the foldable stroller 10 is collapsed to fold up condition, the foldable supporting frame 2 should be downfolded to parallel with the two back frame 12 of the stroller 10.

As shown in FIGS. 1 and 2, when the foldable supporting frame 2 is in use to carry the additional carrying device 40, the foldable supporting frame 2 must be held in a horizontal position. Due to gravity, when the foldable supporting frame 2 is gradually pulled up from the down-folding position, the locking recesses 312, 322 of the two locking arms 31, 32 will respectively engage with the two locking pins 33, 34 so as to lock the main frame 20 in the horizontal position as shown in FIGS. 1 and 2 to support the additional carrying device 40. Practically, the holding arm 21, 22 and the pivot joints 27, 28, the back supporting stem 121, and the locking arm 31, 32 substantially form a strong triangular supporting structure. In other words, the two locking arms 31, 32 not only can lock the main frame 20 rigidly in position, but also form a supporting reinforce to the main frame 20. When the user needs to fold up the foldable supporting frame 2, the user must manually release the locking condition by slightly lifting up the two locking arms 31, 32 until the two locking pins 33, 34 respectively sliding back to the two guiding slots 3 11, 321 so as to prevent the foldable supporting frame 2 from accidentally fallen down.

As shown in FIG. 2, the holding means 50 comprises a pair of holder units 51 integrally affixed on the two holding arms 21, 22 respectively, each of which is positioned between the locking arm 31, 32 and the rear end 212, 222 of the respective holding arm 21, 22. Each of the holder units 51 has two mounting recesses 511, 512 intervally provided on a top wall thereof and a guiding groove 513 extended along an inner side of the holder unit 51 to communicate with the two mounting recesses 511, 512. The guiding groove 513 has a length longer than a distance between the two mounting recesses 511, 512 so as to define a rear locking socket 514.

According to the present first embodiment, as shown in FIG. 2, one end of the gate bar 26 connects a hinge joint 261 rotatably connected to the rear end 212 of one of the holding arm 3 1. Another end of the gate bar 26 connects a clipper 262 for detachably clipping onto the another holding arm 32. Therefore, to open the entrance opening 25 of the main frame 20, the user may simply unclip the clipper 262 from the holding arm 32 and swing up the gate bar 26.

As shown in FIGS. 1 to 2, according to the first preferred embodiment of the present invention, the additional carrying device 40 is embodied as a storage cart which comprises a bracket 41 with wheels 42 rotatably attached thereunder, a pair of frame rods 43, 44 being inclinedly mounted on two sides of the bracket 41 respectively, a pair of connectors 45, 46 respectively affixed to two upper end portion of the two frame rods 43, 44 while two top ends 430, 440 of the two frame rods 43, 44 are upwardly extended above the two connectors 45, 46, a U-shaped handle bar 47 having two lower ends pivotally connected to the two connectors 45, 46 respectively, and a pair of locking holders 48, 49 which are slidably mounted on two side rods 471, 472 of the handle bar 47 respectively for engaging with the two top ends 430, 440 of the two frame rods 43, 44 so as to support the handle bar 47 extending upwards to function as a normal storage cart 40, as shown in FIG. 2.

In order to incorporate the storage cart 40 with the foldable supporting frame 2 of the present invention, two pairs of support heads 431, 441, 473, 474 are outwardly protruded from the pair of frame rods 43, 44 and the two side rods 471, 472 of the handle bar 47 respectively. Lifting up the two locking holders 48, 49 can release the engagement of the two frame rods 43, 44 with the handle bar 47, so that the handle bar 47 can be rotated downwardly until each of the side rods 471, 472 and the respective frame rod 43, 44 form an inversion V-shape structure as shown in FIG. 1, wherein the four support heads 431, 441, 473, 474 are designed to have the same height.

Before installing the storage cart 40, the gate bar 26 is swung up to open the entrance opening 25 of the foldable supporting frame 2. Then, the storage cart 40 is able to be placed within the receiving room 24 between the holding arms 21, 22. Position the four support heads 431, 441, 473, 474 respectively with the four mounting recesses 511, 512 of the two holder units 51 and insert the four support heads 431, 441, 473, 474 into the two guiding grooves 513 of the two holder units 51. By moving the storage cart 40 towards the gate bar 26 can slide the two support heads 431, 441 of the pair of frame rods 43, 44 to be locked in the two locking sockets 513 of the two holder units 51 so that the storage cart 40 is restricted in a locked position to prevent the storage cart 40 from accidentally uninstalled. Finally, swing back the gate bar 26 to horizontal position and re-lock the gate bar 26 by clipping the clipper 262 on the holding arm 22. Therefore, the storage cart 40 is supported and held by the foldable supporting frame 2.

To uninstall the storage cart 40, simply unclip and swing up the gate bar 26, and then the user can detach the storage cart 40 by removing the four support heads 431, 441, 473, 474 from the two holder units 51 via the four mounting recesses 511, 512 respectively.

In view of the above first preferred embodiment, the stroller 10 can additionally carry the storage cart 40 for storing all personal and baby necessities, so that the storage cart 40 which provides additional storage room can be traveled wherever the stroller 10 goes.

Figure 5:
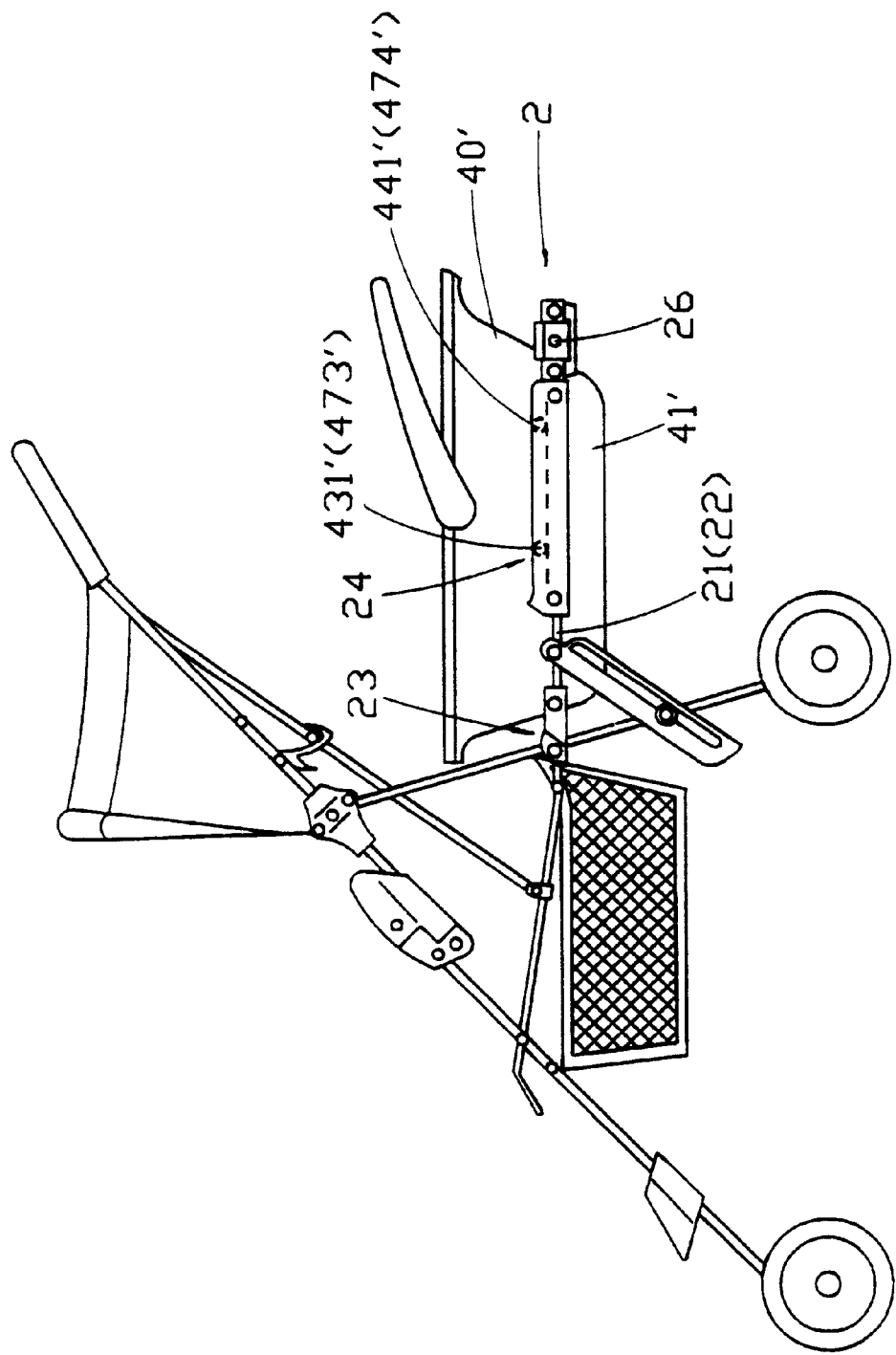
FIG. 5 is a side view of a foldable supporting frame carrying a baby car seat in accordance with a second preferred embodiment of the present invention.

As shown in FIG. 5, a second preferred embodiment of the present invention is illustrated, wherein the additional carrying device is embodied as a baby car seat 40'. The baby car seat 40' can be any conventional type. The parent may simply insert a bottom portion 41' of the baby car seat 40' in the bounded receiving room 24, so that the two holding arms 21, 22, the supporting arm 23 and the gate bar 26 would support the baby car seat 40' in position. In order to further ensure the baby car seat 40' sitting on the foldable supporting frame 2 without unwanted movement, two pair of support heads 431', 441', 473', 474' can be further provided on two sides of the baby car seat 40' for engaging with the two holder units 51 in the same manner as mentioned in the above first preferred embodiment.

In view of above, the present invention can substantially achieve the following advantages:

1. The parent may easily handle the stroller and the storage cart or the baby car seat at the same time without extra labor. If a storage cart is carried by the foldable supporting frame, the parent may collect all the baby necessities and personal stuffs in the storage cart. The parent may also directly move the baby car seat to install on the foldable supporting frame of the stroller, so that the parent can transport both babies at the same time.

2. The foldable supporting frame can also be folded up when the stroller is collapsed.

3. The foldable supporting frame would not occupy space when the stroller is collapsed.

4. The specifically constructed storage cart of the present invention can be used as a normal storage cart or adjusted to fit the foldable supporting frame for rigid construction.

5. The structure of the foldable supporting frame is inexpensive and the operation of the supporting frame is easy and convenience.

What is claimed is:

1. A foldable supporting frame adapted for mounting on a back frame of a stroller, comprising:

a U-shape main frame pivotally connected to said back frame of said stroller in such manner that said main frame is capable of swinging between a horizontal position and a folding position to enable said stroller being collapsed, wherein said main frame comprises two parallel holding arms;

a locking means for locking said main frame in said horizontal position, wherein said locking means comprises a pair of locking arms and two guiding pins, each of said locking arms having a mounting end pivotally connected to said respective holding arm of said main frame, each of said locking arms further providing an elongated guiding slot extended from said mounting end to a free end thereof, each of said guiding slots having a locking recess perpendicularly provided near said free end thereof, wherein said two guiding pins are respectively affixed to two back supporting stems of said back frame of said stroller, wherein said two guiding pins respectively penetrate through said two guiding slots of said two locking arms;

an additional carrying device, which is supported and carried by said main frame, for providing additional storage room; and a holding means affixed on said main frame for detachably holding said additional carrying device in a locked position.

2. The foldable supporting frame, as recited in claim 1, wherein said holding means comprises a pair of holder units integrally affixed on said two holding arms respectively, each of which is positioned between said locking arm and said rear end of said respective holding arm, each of said holder units having two mounting recesses intervally provided on a top wall thereof and a guiding groove extended along an inner side of said holder unit to communicate with said two mounting recesses, said guiding groove having a length longer than a distance between said two mounting recesses so as to define a rear locking socket.

3. The foldable supporting frame, as recited in claim 2, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

4. A foldable supporting frame adapted for mounting on a back frame of a stroller, comprising:

a U-shape main frame pivotally connected to said back frame of said stroller in such manner that said main frame is capable of swinging between a horizontal position and a folding position to enable said stroller being collapsed, said main frame comprising two holding arms and a supporting arm connected between two front ends of said two holding arms respectively to form a connecting side of said foldable supporting frame adapted for pivotally connecting with said back frame of said stroller, wherein two rear ends of said two holding arms are extended rearwardly from said back frame of said stroller, so as to define a bounded receiving room between said two holding arms and said supporting arm, and that an entrance opening is formed between said two rear ends of said two holding arms;

a locking means for locking said main frame in said horizontal position, wherein said locking means comprises a pair of locking arms and two guiding pins, each of said locking arms having a mounting end pivotally connected to said respective holding arm of said main frame, each of said locking arms further providing an elongated guiding slot extended from said mounting end to a free end thereof, each of said guiding slots having a locking recess perpendicularly provided near said free end thereof, wherein said two guiding pins are respectively affixed to two back supporting stems of said back frame of said stroller and respectively penetrate through said two guiding slots of said two locking arms;

an additional carrying device, which is supported and carried by said main frame, for providing additional storage room;

a holding means affixed on said main frame for detachably holding said additional carrying device in a locked position; and a gate bar removably mounted between said two rear ends of said two holding arms respectively for closing said entrance opening and reinforcing said main frame to form a rigid rectangular structure.

5. The foldable supporting frame, as recited in claim 4, wherein said holding means comprises a pair of holder units integrally affixed on said two holding arms respectively, each of which is positioned between said locking arm and said rear end of said respective holding arm, each of said holder units having two mounting recesses intervally provided on a top wall thereof and a guiding groove extended along an inner side of said holder unit to communicate with said two mounting recesses, said guiding groove having a length longer than a distance between said two mounting recesses so as to define a rear locking socket.

6. The foldable supporting frame, as recited in claim 4, wherein one end of said gate bar provides a hinge joint rotatably connected to said rear end of one of said holding arm, while another end of said gate bar connects a clipper for detachably clipping onto said another holding arm.

7. The foldable supporting frame, as recited in claim 5, wherein one end of said gate bar provides a hinge joint rotatably connected to said rear end of one of said holding arm, while another end of said gate bar connects a clipper for detachably clipping onto said another holding arm.

8. The foldable supporting frame, as recited in claim 5, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

9. The foldable supporting frame, as recited in claim 7, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

10. The foldable supporting frame, as recited in claim 5, wherein said additional carrying device has two pairs of support heads provided at two sides thereof, therefore said additional carrying device is able to be sat on said foldable supporting frame while said two pairs of support heads are respectively positioned and restricted in said two guiding grooves of said two holder units through said four mounting recesses thereof.

11. A foldable supporting frame adapted for mounting on a back frame of a stroller, comprising:

a U-shape main frame pivotally connected to said back frame of said stroller in such manner that said main frame is capable of swinging between a horizontal position and a folding position to enable said stroller being collapsed, wherein said main frame comprises two holding arms and a supporting arm connected between two front ends of said two holding arms respectively to form a connecting side of said foldable supporting frame adapted for pivotally connecting with said back frame of said stroller, wherein two rear ends of said two holding arms are extended rearwardly from said back frame of said stroller, so as to define a bounded receiving room between said two holding arms and said supporting arm, and that an entrance opening is formed between said two rear ends of said two holding arms, said foldable supporting frame further comprising a gate bar removably mounted between said two rear ends of said two holding arm s respectively for closing said entrance opening an d reinforcing said main frame to form a rigid rectangular structure;

a locking means for locking said main frame in said horizontal position, wherein said locking means comprises a pair of locking arms and two guiding pins, each of said locking arms having a mounting end pivotally connected to said respective holding arm of said main frame, each of said locking arms further providing an elongated guiding slot extended from said mounting end to a free end thereof, each of said guiding slots having a locking recess perpendicularly provided near said free end thereof, wherein said two guiding pins are respectively affixed to two back supporting stems, below said two pivot joints, of said back frame of said stroller and penetrate through said two guiding slots of said two locking arms;

an additional carrying device, which is supported and carried by said main frame, for providing additional storage room;

a holding means affixed o n said main frame for detachably holding said additional carrying device in a locked position; and a pair of pivot joints each having a connecting end affixed on a middle portion of said respective back supporting stem and a pivot end horizontally extended from said connecting end for pivotally connecting with said two front ends of said two holding arms of said main frame, therefore by means of said two pivot joints, said main frame is capable of selectively folding upwards when not in use and folding downwards until in parallel with said two back supporting stems when said stroller is collapsed.

12. The foldable supporting frame, as recited in claim 11, wherein two holder rings are respectively mounted on two pin ends of said two locking pins and said two locking arms are slidably positioned between said two holder rings and said two back supporting stems of said back frame of said stroller respectively.

13. The foldable supporting frame, as recited in claim 12, wherein said holding means comprises a pair of holder units integrally affixed on said two holding arms respectively, each of which is positioned between said locking arm and said rear end of said respective holding arm, each of said holder units having two mounting recesses intervally provided on a top wall thereof and a guiding groove extended along an inner side of said holder unit to communicate with said two mounting recesses, said guiding groove having a length longer than a distance between said two mounting recesses so as to define a rear locking socket.

14. The foldable supporting frame, as recited in claim 11, wherein one end of said gate bar provides a hinge joint rotatably connected to said rear end of one of said holding arm, while another end of said gate bar connects a clipper for detachably clipping onto said another holding arm.

15. The foldable supporting frame, as recited in claim 12, wherein one end of said gate bar provides a hinge joint rotatably connected to said rear end of one of said holding arm, while another end of said gate bar connects a clipper for detachably clipping onto said another holding arm.

16. The foldable supporting frame, as recited in claim 13, wherein one end of said gate bar provides a hinge joint rotatably connected to said rear end of one of said holding arm, while another end of said gate bar connects a clipper for detachably clipping onto said another holding arm.

17. The foldable supporting frame, as recited in claim 13, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

18. The foldable supporting frame, as recited in claim 16, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

19. A foldable supporting frame adapted for mounting on a back frame of a stroller, comprising:

a U-shape main frame pivotally connected to said back frame of said stroller in such manner that said main frame is capable of swinging between a horizontal position and a folding position to enable said stroller being collapsed, wherein said main frame comprises two holding arms and said holding means comprises a pair of holder units integrally affixed on said two holding arms respectively, each of said holder units having two mounting recesses intervally provided on a top wall thereof and a guiding groove extended along an inner side of said holder unit to communicate with said two mounting recesses, said guiding groove having a length longer than a distance between said two mounting recesses so as to define a rear locking socket;

a locking means for locking said main frame in said horizontal position;

an additional carrying device, which is supported and carried by said main frame, for providing additional storage room; and a holding means affixed on said main frame for detachably holding said additional carrying device in a locked position.

20. The foldable supporting frame, as recited in claim 19, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

21. A foldable supporting frame adapted for mounting on a back frame of a stroller, comprising:

a U-shape main frame pivotally connected to said back frame of said stroller in such manner that said main frame is capable of swinging between a horizontal position and a folding position to enable said stroller being collapsed, wherein said main frame comprises two holding arms and a supporting arm connected between two front ends of said two holding arms respectively to form a connecting side of said foldable supporting frame adapted for pivotally connecting with said back frame of said stroller, wherein two rear ends of said two holding arms are extended rearwardly from said back frame of said stroller, so as to define a bounded receiving room between said two holding arms and said supporting arm, and that an entrance opening is formed between said two rear ends of said two holding arms, said foldable supporting frame further comprising a gate bar removably mounted between said two rear ends of said two holding arms respectively for closing said entrance opening and reinforcing said main frame to form a rigid rectangular structure;

a locking means for locking said main frame in said horizontal position;

an additional carrying device, which is supported and carried by said main frame, for providing additional storage room; and a holding means, which is affixed on said main frame for detachably holding said additional carrying device in a locked position, comprises a pair of holder units integrally affixed on said two holding arms respectively, each of said holder units having two mounting recesses intervally provided on a top wall thereof and a guiding groove extended along an inner side of said holder unit to communicate with said two mounting recesses, said guiding groove having a length longer than a distance between said two mounting recesses so as to define a rear locking socket.

22. The foldable supporting frame, as recited in claim 21, wherein one end of said gate bar provides a hinge joint rotatably connected to said rear end of one of said holding arm, while another end of said gate bar connects a clipper for detachably clipping onto said another holding arm.

23. The foldable supporting frame, as recited in claim 21, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

24. The foldable supporting frame, as recited in claim 22, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

25. The foldable supporting frame, as recited in claim 21, wherein said additional carrying device has two pairs of support heads provided at two sides thereof, therefore said additional carrying device is able to be sat on said foldable supporting frame while said two pairs of support heads are respectively positioned and restricted in said two guiding grooves of said two holder units through said four mounting recesses thereof.

26. The fold able supporting frame, as recited in claim 22, where in said additional carrying device has two pairs of support heads provided at two sides thereof, therefore said additional carrying device is able to be sat on said foldable supporting frame while said two pairs of support heads are respectively positioned and restricted in said two guiding grooves of said two holder units through said four mounting recesses thereof.

27. The foldable supporting frame, as recited in claim 25, wherein said additional carrying device is a baby car seat.

28. A foldable supporting frame adapted for mounting on a back frame of a stroller, comprising:

a U-shape main frame pivotally connected to said back frame of said stroller in such manner that said main frame is capable of swinging between a horizontal position and a folding position to enable said stroller being collapsed, wherein said main frame comprises two holding arms and a supporting arm connected between two front ends of said two holding arms respectively to form a connecting side of said foldable supporting frame adapted for pivotally connecting with said back frame of said stroller, wherein two rear ends of said two holding arms are extended rearwardly from said back frame of said stroller, so as to define a bounded receiving room between said two holding arms and said supporting arm, and that an entrance opening is formed between said two rear ends of said two holding arms, said foldable supporting frame further comprising a gate bar removably mounted between said two rear ends of said two holding arms respectively for closing said entrance opening and reinforcing said main frame to form a rigid rectangular structure;

a locking means for locking said main frame in said horizontal position;

an additional carrying device, which is supported and carried by said main frame, for providing additional storage room;

a holding means, which is affixed on said main frame for detachably holding said additional carrying device in a locked position, comprises a pair of holder units integrally affixed on said two holding arms respectively, each of said holder units having two mounting recesses intervally provided on a top wall thereof and a guiding groove extended along an inner side of said holder unit to communicate with said two mounting recesses, said guiding groove having a length longer than a distance between said two mounting recesses so as to define a rear locking socket; and a pair of pivot joints each having a connecting end, said two connecting ends are respectively affixed on middle portions of two back supporting stems of said back frame of said stroller and a pivot end horizontally extended from said connecting end for pivotally connecting with said two front ends of said two holding arms of said main frame, therefore by means of said two pivot joints, said main frame is capable of selectively folding upwards when not in use and folding downwards until in parallel with said two back supporting stems when said stroller is collapsed.

29. The foldable supporting frame, as recited in claim 28, wherein one end of said gate bar provides a hinge joint rotatably connected to said rear end of one of said holding arm, while another end of said gate bar connects a clipper for detachably clipping onto said another holding arm.

30. The foldable supporting frame, as recited in claim 28, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

31. The foldable supporting frame, as recited in claim 29, wherein said additional carrying device is a storage cart which comprises a bracket with wheels rotatably attached thereunder, a pair of frame rods being inclinedly mounted on two sides of said bracket respectively, a pair of connectors respectively affixed to two upper end portion of said two frame rods while two top ends of said two frame rods are upwardly extended above said two connectors, a U-shaped handle bar having two lower ends pivotally connected to said two connectors respectively, and a pair of locking holders which are slidably mounted on two side rods of said handle bar respectively for engaging with said two top ends of said two frame rods so as to support said handle bar extending upwards to function as a normal storage cart, wherein two pairs of support heads are outwardly protruded from said pair of frame rods and said two side rods of said handle bar respectively, whereby by lifting up said two locking holders and rotating said handle bar downwardly until each of said side rods and said respective frame rod form an inversion V-shape structure, so that said storage cart is able to be placed within said receiving room between said two holding arms while said two pairs of support heads are respectively positioned and restricted in said two guiding grooves of said two holder units through said four mounting recesses thereof.

32. The foldable supporting frame, as recited in claim 28, wherein said additional carrying device has two pairs of support heads provided at two sides thereof, therefore said additional carrying device is able to be sat on said foldable supporting frame while said two pairs of support heads are respectively positioned and restricted in said two guiding grooves of said two holder units through said four mounting recesses thereof.

33. The foldable supporting frame, as recited in claim 28, wherein said additional carrying device has two pairs of support heads provided at two sides thereof, therefore said additional carrying device is able to be sat on said foldable supporting frame while said two pairs of support heads are respectively positioned and restricted in said two guiding grooves of said two holder units through said four mounting recesses thereof.

34. The foldable supporting frame, as recited in claim 33, wherein said additional carrying device is a baby car seat.

* * * * *